Figure 1:
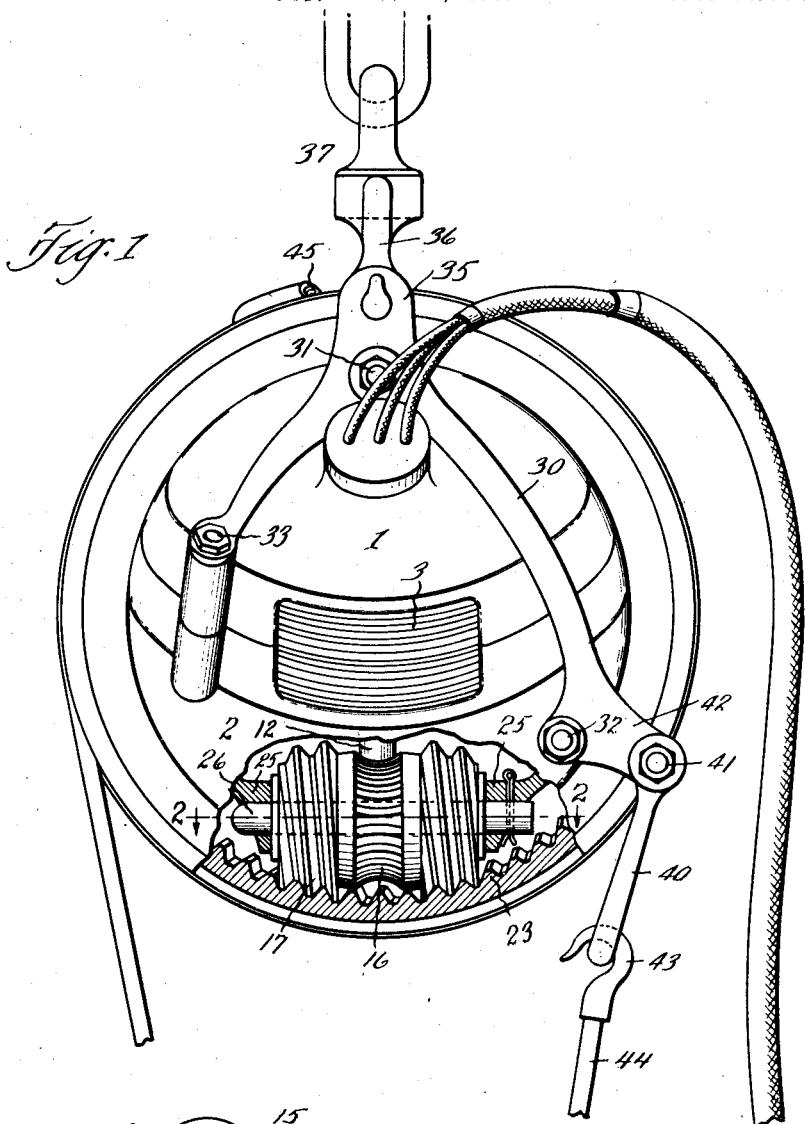

Aug. 3, 1926.

T. E. ADAMS 1,594,987

INTERNAL WORM GEAR

Filed Feb. 19, 1925

3 Sheets-Sheet 1

Inventor
Thomas E. Adams
By Hull, Brock and West
Attys.

Aug. 3, 1926.

T. E. ADAMS 1,594,987

INTERNAL WORM GEAR

Filed Feb. 19, 1925    3 Sheets-Sheet 2

Inventor
Thomas E. Adams
By Hull, Brock & West
Attys.

Aug. 3, 1926.
T. E. ADAMS
1,594,987
INTERNAL WORM GEAR
Filed Feb. 19, 1925 3 Sheets-Sheet 3
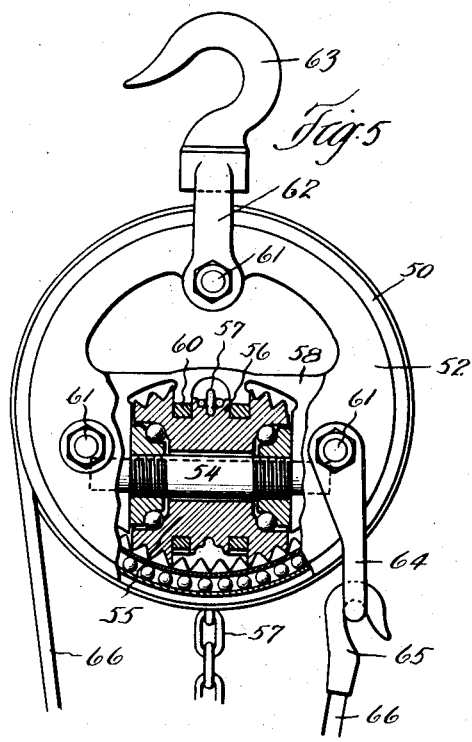
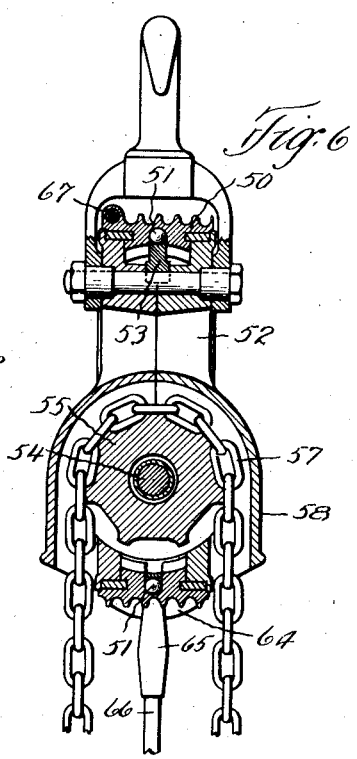
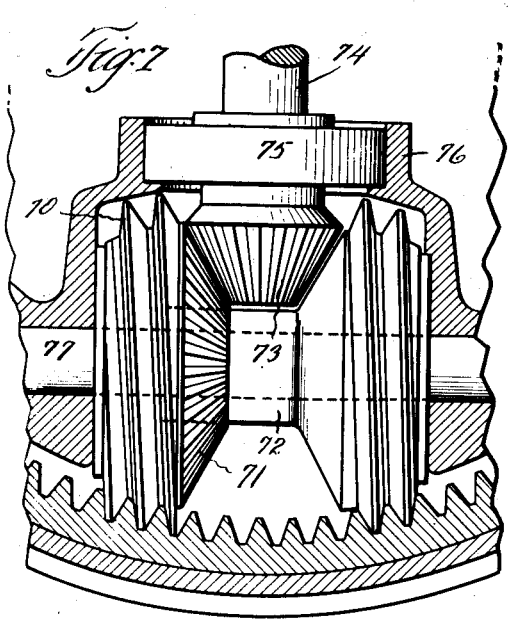
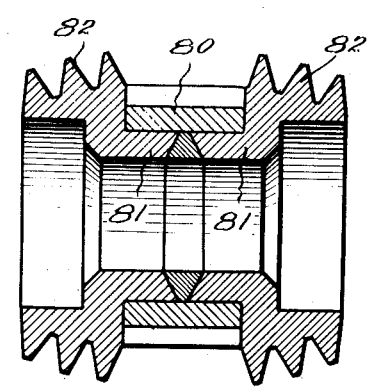
Inventor
Thomas E. Adams
By Hull, Brock & West
Attys.

Patented Aug. 3, 1926.

1,594,987

UNITED STATES PATENT OFFICE.

THOMAS E. ADAMS, OF CLEVELAND, OHIO.

INTERNAL WORM GEAR.

Application filed February 19, 1925. Serial No. 10,157.

This invention relates to improvements in worm gearing, and has to do more particularly with a unique form of internal worm gear and worm for driving the same.

The present application is in most part a division of my copending application No. 646,511, filed June 20, 1923.

While the invention is suited to many uses, it is peculiarly adapted to the transmission of power in the type of hoist disclosed in the above mentioned application and accordingly I have shown it in the present case in the same environment as that in which it is shown in said application.

Broadly, the invention consists in producing a true internal worm gear and a worm for driving the same. By a true internal worm gear is meant a precise reversal of an external worm gear—that is, a turning-inside-out, so to speak, of the common form of worm gear.

I am aware that attempts have been made to produce efficient internal worm gearing, and with a limited measure of success, but it is evidenced by the history of the art that true internal worm gearing has been regarded as an impossibility from a practical view point. My invention is distinguished from the prior art by the arranging of the worm with its axis substantially in the central plane of the internal worm gear. To accomplish this it is necessary to provide a globoid or keg-shaped worm, suitably supported beyond its ends, and having a driving element about its waist or equator for the application of the power.

Among the salient objects sought to be attained through this invention are: higher efficiency and greater strength in worm gearing; permanency of working relations between the worm and gear; increased holding ability; greatly enlarged areas of contact; and improved lubricating qualities.

In a highly desirable embodiment of the invention, a worm gear is formed about the equator of the globoid worm which is driven by a worm of usual type. Thus, in this embodiment, the advantages accruing from my improved internal worm gearing are augmented by those inherent in worm gearing of ordinary type, resulting in greater speed reduction, increased driving power, and enhanced holding ability.

A further object of my invention is to construct the worm of end sections which may be assembled about a suitable driving element whereby a variety of driving elements may be employed, such as spur gears, beveled gears, chain sprockets, as well as worm gears of different materials thereby permitting, for example, a steel worm to be used for driving the internal worm gear, and a bronze gear to be employed for driving said worm. By providing for the use of different materials, the range of usefulness of the internal worm gear is very materially broadened.

Figure 2:
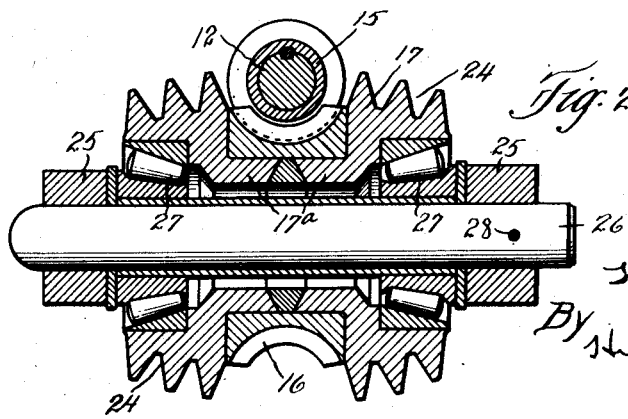
Figure 3:
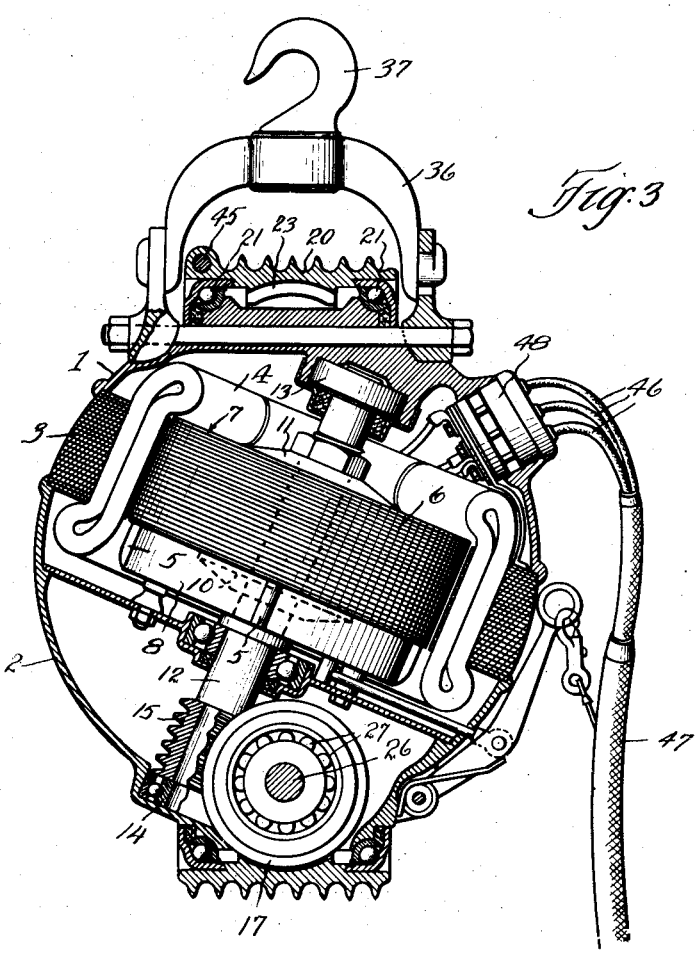
Figure 4:
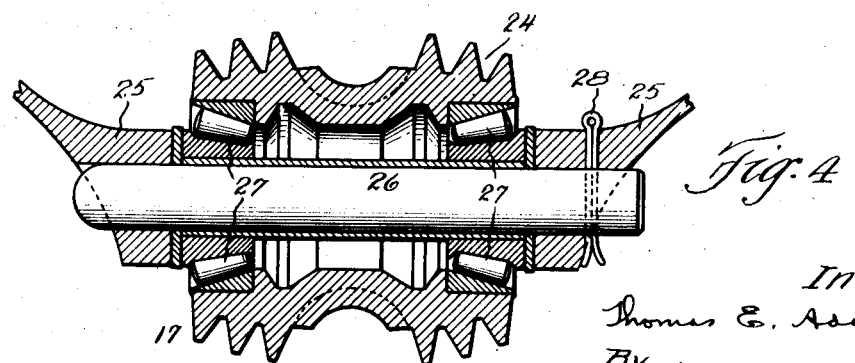

The foregoing objects, with others hereinafter appearing, are attained in the embodiments of the invention illustrated in the accompanying drawings wherein Fig. 1 is an elevational view of an electric hoist incorporating the invention, parts being broken away to reveal the worm and a part of the internal worm gear; Fig. 2 is a sectional detail on the line 2—2 of Fig. 1; Fig. 3 is a central vertical section through the hoist at right angles to the plane of Fig. 1; Fig. 4 is a sectional detail, similar to Fig. 2, showing a one-piece worm and worm gear; Fig. 5 is a sectional side elevation of a manually operated chain driven hoist incorporating the invention; Fig. 6 is a transverse, central vertical section through the hoist shown in Fig. 5; Fig. 7 is a detail of a modification of the invention wherein the worm is driven through beveled gears; and Fig. 8 is a sectional detail of a worm having a spur gear applied to it.

The portable electric hoist wherewith I have shown the invention associated, incorporates a substantially spherical motor casing comprised of upper and lower sections 1 and 2, respectively. The motor is shown as of the three-phase induction type. The stator 3 is supported in a plane transverse the inclined axis of the casing, and the edges of the casing meet about the stator.

The primary winding 4 is suitably engaged within slots or grooves of the stator, while the secondary "winding", so called, is made up of conductor rods 5 which extend through the laminations of the rotor 6 and are connected at their ends to rings 7 and 8. The rotor is clamped between flanges 10 and 11 on the motor shaft 12. The respective upper and lower ends of the shaft 12 are journaled within anti-friction bearings 13 and 14 which are contained in cavities formed in the casing sections.

A worm 15 is secured to the lower end of the motor shaft and meshes with a worm gear 16 that is formed about the waist or equator of what I may term a combined worm and drive member 17, the end portions whereof are provided with threads. This combined worm and drive member is, in effect, a worm having the central portion of its thread interrupted, the lead of the threads at the two ends being one and the same and therefore, in effect, continuous.

While, in many cases, the combined worm and drive member 17 may be composed of an integral unit, as illustrated in Fig. 4, it may to advantage, in other instances be constructed of opposite end sections that are assembled about a central drive member, as illustrated in Fig. 2. In fact, this construction may be found necessary when certain types of driving members are used. In the device illustrated in Fig. 2, the end sections are provided with hub extensions 17a which are inserted within the bore of the driving member or worm gear 16, and the parts are secured together, as by arc welding. In the manufacture of the device the parts, having been machined and heat treated, are assembled as described and after the parts are properly secured together, the bearing surfaces may be ground to the required accuracy. It is apparent that this construction permits a wide choice of driving devices and of materials and greatly aids in the application of internal gears to mechanical uses.

A hoisting drum 20, shown as provided with the usual cable groove, surrounds the motor casing and is supported therefrom through suitable anti-friction bearings 21. An internal worm gear 23 extends about the interior of the drum 20 and the teeth of said gear mesh with the threaded portions 24 of the combined worm and drive member 17. The lower casing section 2 is provided with brackets 25 which overhang the worm gear 23 and support a stub shaft 26 whereon the combined worm and drive member 17 is mounted through anti-friction bearings 27. Suitable means, such as a cotter pin 28 extending through registering holes in one of the brackets 25 and the shaft 26, may be employed to retain the shaft against longitudinal displacement.

Frames 30 are disposed on opposite sides of the motor casing and are secured thereto by bolts 31 and 32 which pass through the casing and through portions of said frames. The frames are further secured to the motor casing by bolts 33 which assist in securing the sections 1 and 2 of the casing together. To lugs 35 of the frames 30 are pivotally connected the ends of a yoke 36 which has swiveled to it a suspension hook 37 by means of which the hoist may be hung from a suitable sustaining structure. A loop 40 is pivotally connected at 41 to extensions 42 of the frames 30, and a hook 43, that is secured to one end of a hoisting cable 44, is engaged with the loop 40. The other end of the cable is fastened at 45 to the drum 20. The cable is adapted to wind upon the drum and follow the spiral groove thereof in the usual manner. A suitable sheave block (not shown) equipped with a lifting hook or grapple may be suspended upon the cable according to common practice.

Electrical connection is made between sections of the primary winding 4, and leads 46 of a cable 47, through a suitable plug 48. The winding is in accordance with the usual construction of three-phase induction motors.

In the chain operated hoist, illustrated in Figs. 5 and 6, the drum is designated 50 and it is supported, through a ball bearing 51, from a frame 52 made up of two side members between which the ball supporting and retaining ring 53 is clamped. A shaft 54 is supported by the frame 52 and mounted thereon is a combined worm and drive member 55. The essential difference between the present combined worm and drive member and the one previously described is the replacement of the equatorial worm gear by a chain sprocket 56 which is formed about the waist of the worm. A chain 57 is engaged over the sprocket 56 and hangs down on opposite sides of the drum. By means of the chain the worm may be rotated to impart rotation to the drum.

The frame 52 incorporates casings 58 which enclose the threaded ends of the combined worm and drive member 55, and these casings provide lubricant chambers. Packing rings 60 are interposed between the portions of the casings 58 which surround the openings through which the worm is engaged and adjacent smooth portions that are formed on the worm, thereby to prevent egress of the lubricant and ingress of dust or grit. The two halves of the frame 52 are connected together by bolts 61, the one occurring at the top of the frame serving as a means for connecting a yoke 62 to the frame. A suspension hook 63 is swiveled to the yoke. To another of the bolts 61 is connected a loop 64 through which a hook 65, connected to one end of a cable 66, is engaged. The other end of the cable is fastened to the drum, as indicated at 67 in Fig. 6.

The combined worm and drive member 70 that is shown in Fig. 7 is made up of threaded end sections, one of which incorporates a beveled gear 71 and receives an extended hub portion 72 of the other section, the parts being suitably secured together as by arc welding. The beveled gear 71 is driven by a pinion 73 on the end of a shaft 74 which is journaled in an anti-friction bearing 75 that is housed within a hollow boss 76 of the supporting structure. Sustained within parts of the same structure are the ends of a shaft 77 on which the combined worm and drive member 70 is mounted.

Fig. 8 shows a modification of the combined worm and drive member which is similar to that illustrated in Fig. 2. In the present case, however, a spur gear 80 is employed as a driving member, and projecting into the opposite ends of the bore of the gear are the hub extensions 81 of the threaded sections 82, the parts being suitably connected together, as by arc welding.

From the foregoing it will be seen that my invention provides a highly efficient power transmitting unit, and one which is susceptible to very effectual lubrication in that a very extenstive surface contact is afforded between the threads of the worm and the gear. This fact will also be appreciated that internal worm gearing of the character herein shown has all the advantages of multi-thread worm gearing of the external variety without increasing the ratio between the worm and worm wheel and without sacrificing any of the load holding ability. Also, with my improved internal worm gearing, with a single thread worm, the contact is full width and full length of the teeth and all the convolutions of the worm are in contact with the gear teeth.

Having thus described my invention, what I claim is:—

1. In combination, an internal worm gear, bearings disposed within the enclosure of said gear, and a unit rotatably supported by and between said bearings with its axis in substantially the central plane of said gear, said unit incorporating a thread meshing with the teeth of said gear and a circumferential driving part spaced axially from said thread.

2. In combination, an internal worm gear, a worm adapted to be supported with its axis substantially in the plane of said gear for driving connection with the gear, said worm having a gear extending about its equator.

3. Two worm gears in series comprising, in combination, an internal worm gear, a worm meshing therewith, said worm having a worm gear extending about its equator, and a second worm meshing with the equatorial worm gear.

4. In combination, a driving gear having a bore, and a worm comprised of sections disposed on opposite sides of said gear and having extensions projecting into the bore, the parts being suitably secured together.

5. As a new article of manufacture, a composite unit consisting of a driving member, a worm comprised of sections disposed on opposite sides of said member, and means extended through the plane of the driving member for securing the parts together with the threads of said worm sections in continuous lead.

In testimony whereof, I hereunto affix my signature.

THOMAS E. ADAMS.